US 8,250,641 B2

(12) United States Patent
Morgan et al.

(10) Patent No.: US 8,250,641 B2
(45) Date of Patent: Aug. 21, 2012

(54) METHOD AND APPARATUS FOR DYNAMIC SWITCHING AND REAL TIME SECURITY CONTROL ON VIRTUALIZED SYSTEMS

(75) Inventors: Dennis Morgan, Pine Grove, CA (US); Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 854 days.

(21) Appl. No.: 11/856,587

(22) Filed: Sep. 17, 2007

(65) Prior Publication Data
US 2009/0073895 A1 Mar. 19, 2009

(51) Int. Cl.
*G06F 9/00* (2006.01)
(52) U.S. Cl. .......................................... 726/11
(58) Field of Classification Search .................. 726/24, 726/11
See application file for complete search history.

(56) References Cited

U.S. PATENT DOCUMENTS

| | | | |
|---|---|---|---|
| 7,353,428 B2* | 4/2008 | Cheston et al. | 714/38 |
| 7,765,544 B2* | 7/2010 | Brickell et al. | 718/1 |
| 2005/0071668 A1* | 3/2005 | Yoon et al. | 713/200 |
| 2005/0086523 A1* | 4/2005 | Zimmer et al. | 713/201 |
| 2006/0021029 A1 | 1/2006 | Brickell et al. | |
| 2006/0136720 A1* | 6/2006 | Armstrong et al. | 713/164 |
| 2006/0206300 A1* | 9/2006 | Garg et al. | 703/27 |
| 2007/0168547 A1* | 7/2007 | Krywaniuk | 709/238 |
| 2008/0127348 A1* | 5/2008 | Largman et al. | 726/24 |
| 2008/0163370 A1* | 7/2008 | Maynard | 726/22 |

FOREIGN PATENT DOCUMENTS

| | | |
|---|---|---|
| CN | 1961272 A | 5/2007 |
| CN | 1973264 A | 5/2007 |
| EP | 1282030 A1 | 2/2003 |
| WO | 03085497 A2 | 10/2003 |

OTHER PUBLICATIONS

Grobmann [sic], "Intel Virtualization Technology Implementation Details" White Paper, Dec. 31, 2006, XP009109950, 14 pages.
Lee, et al., "An Overview of Security Issues in Cluster Interconnects", Sixth IEEE International Symposium on Cluster Computing and the Grid Workshops (CCGRIDW'06), 2006, 9 pages.
Office Action received for European Patent Application No. 08253044.5, mailed on Apr. 23, 2009, 4 pages.
Office Action received for European Patent Application No. 08253044.5, mailed on Apr. 28, 2010, 5 pages.
Office Action received for European Patent Application No. 08253044.5-2413, mailed on Feb. 10, 2011, 5 pages.
European Search Report for EP Patent Application No. 08253044.5-2413, mailed on Feb. 10, 2009, 3 pages.

(Continued)

*Primary Examiner* — Peter Poltorak
*Assistant Examiner* — Teshome Hailu
(74) *Attorney, Agent, or Firm* — Barnes & Thornburg, LLP

(57) ABSTRACT

In some embodiments, the invention involves securing network traffic to and from a host processor. A system and method is disclosed which utilizes a second processor on a virtualization technology platform to send/receive and triage messages. The second processor is to forward suspect messages to a virtual appliance for further investigation before routing the suspect messages to one of a plurality of virtual machines running on the host processor. When messages are not suspect, use of the virtual appliance is avoided and messages are routed to one of a plurality of virtual machines via a virtual machine manager running on the host processor. Other embodiments are described and claimed.

18 Claims, 3 Drawing Sheets

OTHER PUBLICATIONS

Office Action received for Chinese Patent Application No. 200810168008.3, mailed on Apr. 14, 2011, 6 pages of Office Action and 11 pages of English Translation.

Office Action received for Chinese Patent Application No. 200810168008.3, mailed Apr. 26, 2012, 12 pages of unofficial English summary translation and 8 pages of Chinese Office Action.

* cited by examiner

METHOD AND APPARATUS FOR DYNAMIC SWITCHING AND REAL TIME SECURITY CONTROL ON VIRTUALIZED SYSTEMS

FIELD OF THE INVENTION

An embodiment of the present invention relates generally to network traffic to and from a host processor and, more specifically, to a system and method to utilize a second processor on a virtualization technology platform to send/receive and triage messages. The second processor is to forward suspect messages to a virtual appliance for further investigation before routing the suspect messages to one of a plurality of virtual machines running on the host processor.

BACKGROUND INFORMATION

Various mechanisms exist for enabling virtualization on a platform. Virtualization Technology (VT) may be implemented in a variety of ways on platforms, for instance, available from Intel Corporation. VT enables hardware based virtualization of operating systems. One platform is implemented such that the architecture is split into two virtualized operating systems (OSs): a service OS (SOS) and a capability OS (COS).

The service OS may also be called a virtual appliance. The capability OS is analogous to the OS on a client on a platform, i.e., the user environment. One objective of this architecture is to remove several security functions from the purview of the user and move to a more protected area within the service OS. The service OS is put into line between the network and the user environment to provide the additional level of security.

In this particular VT model having a SOS and COS, the platform is limited to only one partition beyond the virtual appliance, or SOS, i.e., the COS. The SOS and COS may be the only partitions on this type of architecture. In this architecture, to maintain increased level of network message security, all of the network traffic is through the SOS.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to adding a layer of security on virtualized platforms to help detect and prevent a VT platform from attack, for instance by malicious rootkits. Embodiments of the invention may also enable increased performance while maintaining increased security in the platform. In at least one embodiment, the present invention is intended to take the security appliance (SOS) out of the direct path from network to COS. The SOS now only handles a subset of the network traffic. The majority of network traffic may be routed by a separate processor on the platform.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

In existing system, funneling data through the SOS is in a 2-way fixed path: either the data moves from the SOS to the COS, or user environment; or the data moves in a path from the COS to the SOS and then drops back out onto the network, when appropriate. In an embodiment of the present invention, multiple virtual partitions (COS) may be in use on the platform and data communication may be routed to more than one COS by utilizing a hypervisor virtual machine manager. Security may be implemented to route data selectively, based on what type of data or package is being sent through the pipe. Selectively routing data will reduce overhead and improve performance.

Figure 1:
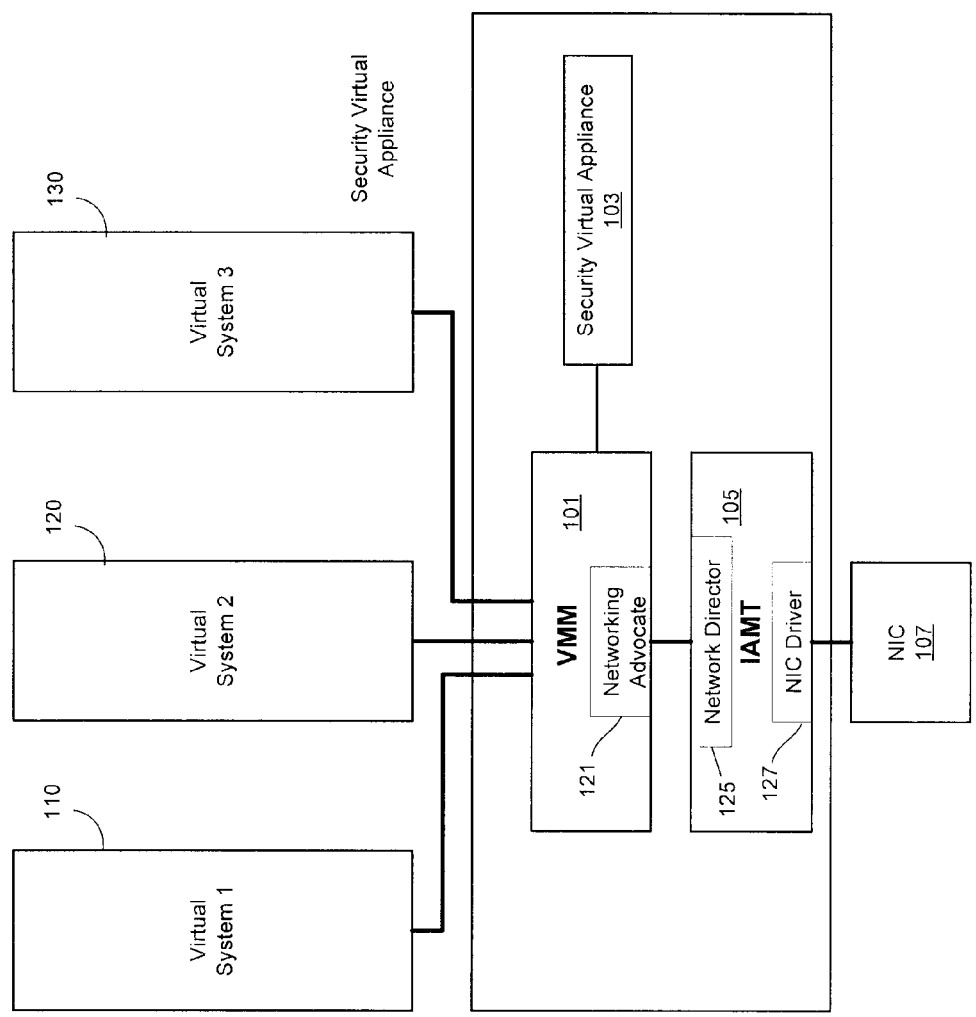
FIG. 1 is a block diagram of an exemplary platform performing additional security functions, according to an embodiment of the invention.

FIG. 1 is a block diagram of an exemplary platform performing additional security functions, according to an embodiment of the invention. In an embodiment of the invention, a platform 100 has a virtual machine manager (VMM) 101 coupled to a security virtual appliance 103. The VMM 101 is also coupled to a separate processor 105, such as one having Intel® Active Management Technology (iAMT). The iAMT 105 is coupled to a network interface controller/card (NIC) 107, to communicate with the network. The platform may have multiple virtual systems (e.g., virtual machines or capability operating systems), 110, 120 and 130 which are managed by the VMM 101.

Embodiments of the invention are controlled by a Networking Advocate 121, a Networking Director 125 and a firmware-based NIC driver 127. In existing systems, the NIC would have been owned and controlled by the SOS, or virtual appliance 103. In the existing platform architecture, the NIC is the only hardware to be owned by the SOS. In embodiments of the invention, the NIC is now owned by the iAMT component of the platform.

Figure 2:
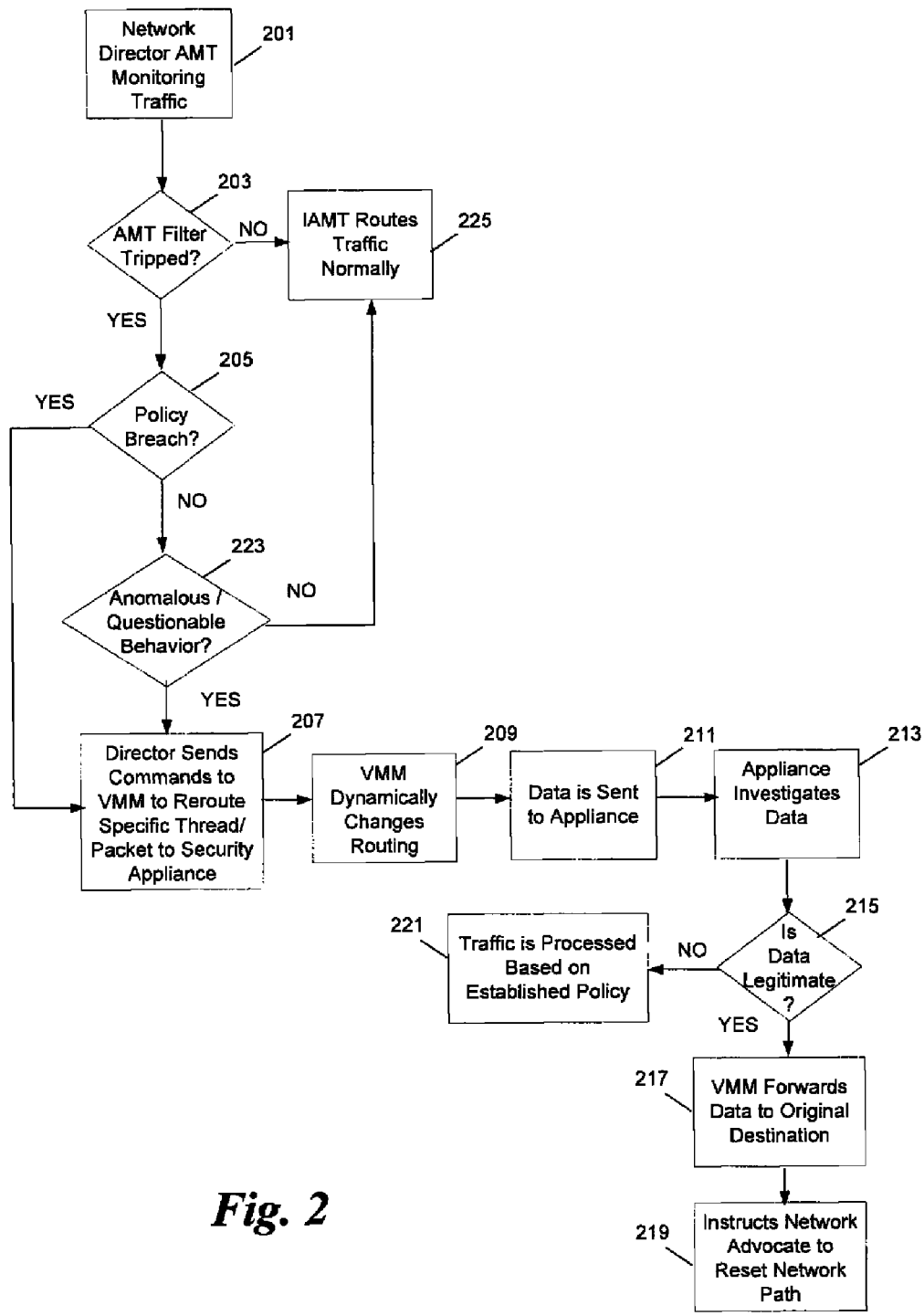
FIG. 2 is a flow chart illustrating an exemplary method for controlling security and communications on the platform, according to an embodiment of the invention.

FIG. 2 is a flow chart illustrating an exemplary method for controlling security and communications on the platform, according to an embodiment of the invention. FIG. 2 will be discussed in conjunction with the block diagram of FIG. 1. The Network Director 125 monitors traffic through the NIC 107 in block 201. The iAMT already monitors and controls network traffic to some extent, at least to route data to the appropriate virtual system 110, 120, 130. The Network Director 125 provides additional traffic monitoring capabilities to identify suspicious traffic through the use of filters. However, the Network Director 125 is to identify, but not enforce behavior. When a filter is tripped at block 203, the Network Director 125 is to determine whether a platform policy has been breached. If there is a policy breach, as determined at block 205, then the Network Director 125 sends a command, in block 207, to the VMM 101 to reroute the specific thread/packet to the security virtual appliance 103 for handling.

The intended route was to have been from the network to a virtual system 110, 120 or 130. Instead, based on the filter, the iAMT reroutes some traffic to the security virtual appliance 103, first. The VMM 101 dynamically changes the routing in block 209. With the routing change, the data is now sent to the security virtual appliance 103, in block 211. The security virtual appliance investigates the data, in block 213. This analysis may be deep packet analysis, stateful inspection, etc. A stateful inspection may also be referred to as dynamic packet filtering. A stateful inspection is a firewall architecture that works at the network layer. Unlike static packet filtering, which examines a packet based on the information in its header, stateful inspection tracks each connection traversing all interfaces of the firewall and makes sure they are valid. An example of a stateful firewall may examine not just the header information but also the contents of the packet up through the application layer in order to determine more about the packet than just information about its source and destination. A stateful inspection firewall also monitors the state of the connection and compiles the information in a state table. Because of this, filtering decisions are based not only on administrator-defined rules (as in static packet filtering) but also on context that has been established by prior packets that have passed through the firewall. Functionality of the inspections is an ISV (independent software vendor) implementation. If the data is legitimate, as determined in block 215, the VMM 101 forwards the data to the original destination, in block 217. The VMM 101 then instructs the Network Advocate 121 to reset the network path, in block 219. Legitimate traffic is traffic defined as appropriate and non-suspicious or Malicious in nature.

When the traffic is not legitimate, as determined in block 215, the data is then processed according to established policy, in block 221. The policy may direct the VMM to reset the connection or alert/notify the console of suspicious traffic or activity. If there was no policy breach found in block 205, a determination may be made that the behavior was nevertheless questionable or anomalous, in block 223. If the behavior is questionable, the processing may continue at block 207, as described above. If the filter is not tripped at all, as determined in block 203, then the iAMT 105 routes the traffic to the intended recipient (i.e., virtual system) without intervention from the VMM 101 or security virtual appliance 103, in block 225.

The iAMT filter may detect abuses of protocol, for instance, anomalous packet size or incorrectly packed packets. The filter may detect repeated "sins or acts," such as denial of service attacks. Address spoofing may be detected and blocked. Outbound ftp traffic from a domain controller may indicate malicious behavior and be filtered.

New applications being introduced to the system or poorly written applications may not breach policy per se, but may look suspicious. Data passing back and forth on an unexpected port may be suspicious, for instance, but not breach protocol. Further investigation by the security appliance may be desirable in these cases.

In embodiments of the invention, the iAMT acts as a gatekeeper for network message traffic into the system. Once criteria in the filter is met, the identified traffic is routed to the security virtual appliance for further investigation. In systems of the prior art, the virtual appliance would have had to route all traffic, thereby creating a bottleneck to the system. When there is no breach, or rather when the filter criteria is not met, the iAMT passes the traffic through to the VMM which then routes the traffic to the correct virtual system. Since the VMM is routing the traffic, more than one user environment, or COS, may be implemented on the platform. Outgoing message traffic is also routed via the iAMT.

The Network Director 125 may be implemented as firmware in the iAMT. The Network Advocate 121 may be implemented as software in the VMM. The Network Advocate 121 adjusts the routing of the message, i.e., pass through to the virtual system or sent to the security virtual appliance for investigation. The HECI interface typically connects the iAMT with the host processor. In some embodiments, the iAMT may be referred to as a manageability engine (ME). The message packet contains routing information indicating to which virtual system the packet should be sent. When there is no problem with the packet, the VMM is then able to pass the packet to the appropriate virtual system.

The Network Director 125 directs the Networking Advocate 121 to send suspicious messages to the security appliance. Once the message has been cleared by the security virtual appliance, the virtual appliance 103 clears the routing instruction with the Network Advocate 121. The security virtual appliance pushes the message back to the VMM to be routed to the virtual system and then notifies the Network Advocate to clear the message route. Once the message route is cleared, every packet in the route will no longer require inspection. The Network Advocate will then forward packets in the stream to the VMM for routing. Thus, bottleneck for the security appliance is alleviated by some message packets being sent directly through via the VMM.

In an embodiment, higher level functions may be performed by the security virtual appliance. Data unrelated to message packet data may be sent to the security virtual appliance for investigation and validation. Packet data may be checked that are suspect or malicious in some way. The security virtual appliance may launch a virtual machine (VM) and feed the packet data to the VM to observe the results of executing or accepting the packet in the VM. If the data is malicious, the target user environment is not affected.

In existing systems having SOS and COS architecture communicated with one another via shared memory. In this architecture, network message traffic does not actually get passed through to the VMM. The message traffic came in via the SOS (virtual appliance) and then was saved in shared memory. The COS has access to shared memory and would retrieve the message packet from shared memory. Without using the VMM or a hypervisor, this architecture does not allow for pushing data to more than one VM, or user environment. Moreover, empirical data has shown that this architecture results in a 35-50% processor usage just to handle network message traffic. Thus, the use of the iAMT to offload some of the message traffic allows for a significant improvement in performance.

In one embodiment, platform policy that dictates packet routing and what criteria is to identify suspect message traffic, is stored in a protected portion of flash, or non-volatile, memory. One advantage of the iAMT is that the iAMT may have access to the platform flash memory. A portion of the flash memory may be partitioned at boot time so that the operating system, including VMM and VM partitions have no access to this portion. Thus, the rules, or policy may be stored in a secure location that is safe from tampering.

Referring again to FIG. 1, the Network Director 125 provides dispositioning of traffic based on normal iAMT criteria through direct interaction with existing iAMT components such as the iAMT heuristics engine, system defense firewall and agent presence service. The Network Director 125 would also dynamically redirect traffic through the Virtual Security Appliance/Service Operating System, in conjunction with the Networking Advocate 121, for further investigation and classification.

The Networking advocate 121 is typically code included in the Virtual Machine Manager (VMM) which would be capable of altering networking paths dynamically based on instructions from the Networking Director 125.

When the virtual security appliance determines that a packet is authorized to pass through to the VM, the security appliance notifies the Networking Director 125, via the VMM, and the Network Director 125 notifies the Networking Advocate 121 to pass on the packet, adjusting its path. In contrast, when it is determined that the message is malicious, bad, or otherwise invalid, the Virtual Security Appliance notifies the Network Director 125 of this status and the Network Director 125 notifies the Networking Advocate 121, which then drops the offensive message(s). In an embodiment, the Network Director 125 may notify a management console, or otherwise notify a user, that suspicious message activity has been detected. The message may be dropped altogether, or be sent to a quarantine, or be archived for later study or replay.

A firmware-based NIC driver, for the host processor, is to be added to the iAMT, which gives the iAMT ownership of all physical Network Interfaces. In this architecture, each operating system in a virtual machine would use virtual NICs to communicate, where the physical communication goes through the NIC driver.

In an embodiment, out-of-band (OOB) communication may still be routed through the iAMT with a separate NIC or communication pathway.

As discussed above, an embodiment of the invention controls incoming/outgoing message traffic by utilizing a microcontroller separate from the host processor on the platform. The microcontroller may have active management technology (AMT) capabilities, such as Intel® Active Management Technology (iAMT) capabilities, as well as having out-of-band (OOB) communication capabilities, hereinafter referred to as an out-of-band (OOB) microcontroller, or also interchangeably referred to as a manageability engine (ME) controller or iAMT. Intel® Active Management Technology (iAMT) is described at URL www*intel*com/technology/manage/iamt/. In embodiments of the invention, the innate OOB capabilities of the microcontroller are enhanced by adding an additional NIC, or NIC channel, to the ME for all host processor traffic.

Figure 3:
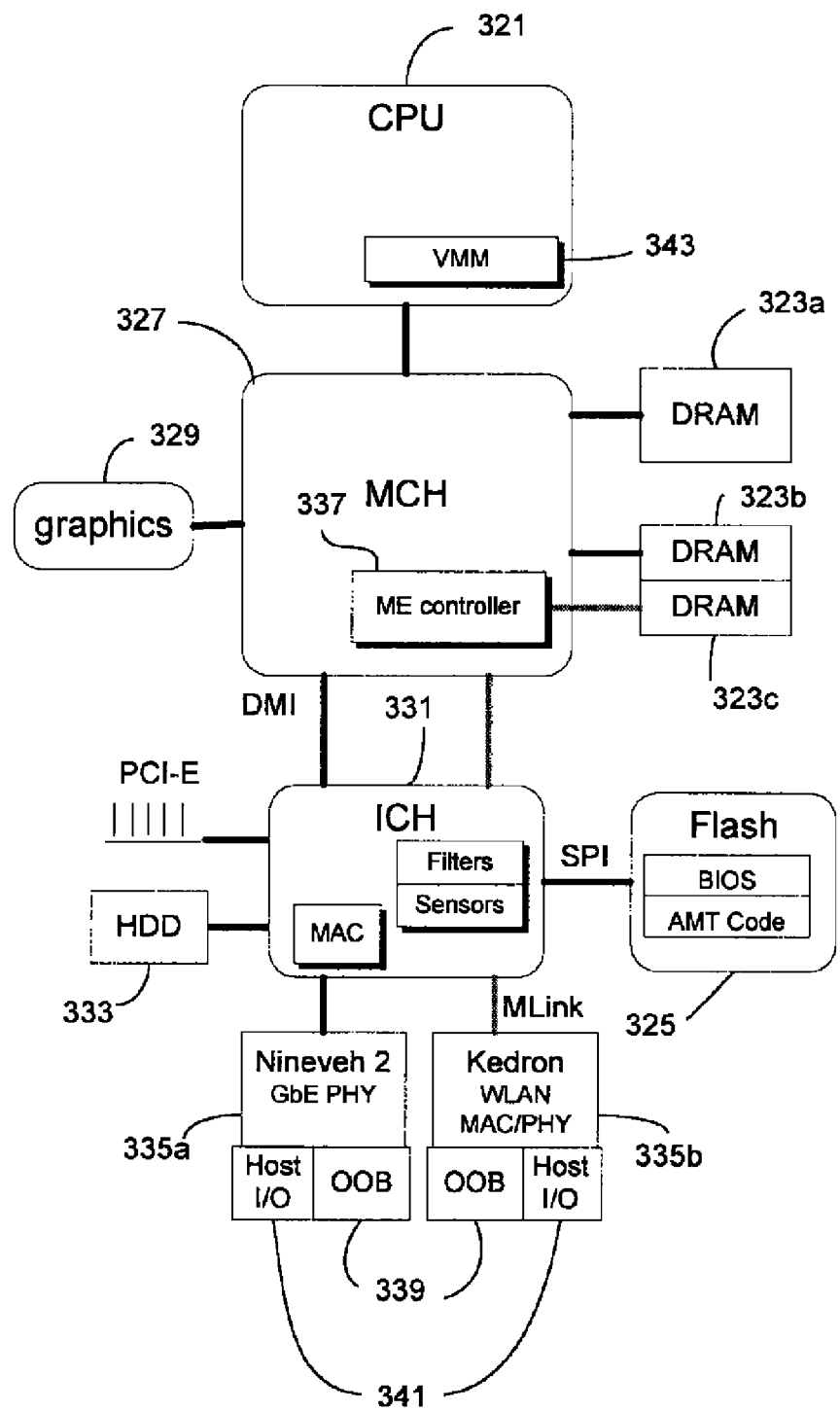
FIG. 3 is a block diagram illustrating an exemplary client platform, according to embodiments of the invention.

FIG. 3 illustrates an exemplary client platform, according to embodiments of the invention. In an exemplary client embodiment, the platform comprises a processor 321 having a VMM 343. The processor 321 is communicatively coupled to DRAM 323a-c via a memory controller hub (MCH), or north bridge 327. The MCH 327 may communicate to a graphics interface 329 and an input/output controller hub (ICH) 331. The ICH 331 may communicate with a hard disk drive (HDD) 333, flash memory 325 and one or more network interface devices 335a-b, for instance the Ninevah 2 Ethernet controller or the Kedron wireless LAN adapter, both available from Intel Corp. In an exemplary embodiment, the network devices 335a-b may have both an out-of-band (OOB) communications component 339, as well as functioning as the in-band NIC. In this embodiment, the ME subsystem 337 may be built into the MCH 327. The flash memory 325 comprises the firmware code (BIOS), protected AMT code and manufacturer settings. It will be apparent to one of skill in the art that processor 321 may comprise single or multi-processors and/or may have more than one core.

In another embodiment (not shown), the ME 337 may be coupled to an input/output hub (IOH) which is coupled to the processor 321 and ICH 331, instead of the MCH 327. It will be apparent to those skilled in the art that a variety of architectures may be implemented depending on a variety of factors, for instance, whether the platform is intended to be a client or server.

The exemplary embodiment shown in FIG. 3 utilizes a manageability engine (ME) 337 to send and receive network traffic via a network interface 335a-b. Platform policies with rules identifying anomalous message traffic may be stored in a protected memory, for instance flash 325. The same NIC device may be used for both host communication 341 and OOB 339 by utilizing filters in the ICH that look for specifically crafted traffic. When the ICH 331 finds the specially crafted traffic it is forwarded to the ME 337.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for securing network traffic to a platform, comprising:
    a host processor on the platform having virtualization technology capability;
    a virtual machine manager (VMM) to execute on the host processor, the VMM to control a plurality of virtual machines running on the host processor;
    a security virtual appliance to investigate suspicious network traffic, the security virtual appliance to run on a first virtual machine of the plurality of virtual machines;
    a second processor on the platform coupled to the host processor, the second processor to (i) control network communication and (ii) send and receive network traffic to/from the plurality of virtual machines running on the host processor, the second processor to use at least one filter to first identify whether network traffic is suspicious or non-suspicious, wherein the second processor to identify the network traffic as suspicious when the network traffic meets criteria of the network filter;
    wherein the second processor to:
        (i) route, in response to first identifying that the network traffic is suspicious with the at least one filter, the suspicious network traffic to the security virtual appliance for additional investigation, and
        (ii) route, in response to first identifying that the network traffic is non-suspicious with the at least one filter, the non-suspicious traffic to an originally intended recipient running on the host processor, the originally intended recipient being another virtual machine of the plurality of virtual machines; and
    wherein the security virtual appliance to subsequently perform a deep packet analysis on the suspicious network traffic to determine whether the suspicious network traffic identified by the second processor is harmless or non-harmless, the security virtual appliance to:
        (i) enable, in response to subsequently determining that the suspicious network traffic is harmless, the harmless traffic to be routed to the originally intended recipient running on the host processor, and
        (ii) enable, in response to subsequently determining that the suspicious network traffic is non-harmless, the non-harmless traffic to be dropped.

2. The system as recited in claim 1, wherein the second processor comprises a manageability engine having active management technology architecture.

3. The system as recited in claim 2, wherein the second processor is coupled to an input/output controller hub (ICH) via one of a memory controller hub (MCH) or input/output hub (IOH), and wherein the ICH is coupled to a network interface device for sending and receiving the network traffic.

4. The system as recited in claim 1, wherein the VMM comprises a networking advocate component for (i) routing the suspicious network traffic to the security virtual appliance for inspection or (ii) resetting a message route for the harmless network traffic to the originally intended recipient, and
    wherein the second processor comprises a network director to monitor network traffic, the network director to command the networking advocate to route received network traffic, wherein the networking director uses the at least one filter to determine whether the networking advocate should route the network traffic to the originally intended recipient or to the security virtual appliance.

5. The system as recited in claim 4, wherein network drivers to be used by the plurality of virtual machines are virtualized to utilize a network interface communicatively coupled to the second processor.

6. The system as recited in claim 1, wherein additional investigation by the security virtual appliance comprising to route the suspicious network traffic to a second virtual machine of the plurality of virtual machines to observe behavior of the suspect network traffic to help in identifying whether the network traffic is harmless or non-harmless, the second virtual machine is different than the originally intended recipient.

7. A computer implemented method for securing network traffic to a host processor on a platform having virtualization technology capability, comprising:
    (a) receiving a network packet by a second processor on the platform, the second processor communicatively coupled to the host processor; and
    (b) applying, by the second processor, at least one filter to first determine whether the network packet is of suspect status, the network packet is determined to be of suspect status when the network packet meets criteria of the at least one filter,
        (i) when the network packet is first determined to be of non-suspect status, routing the network packet directly to an originally intended recipient of the network packet via a virtual machine manager (VMM) executing on the host processor, the originally intended recipient of the network packet running in a first virtual machine executing on the host processor, and (ii) when the network packet is first determined to be of suspect status:
  indicating, by the second processor the suspect status of the network packet to the virtual machine manager executing on the host processor,
  forwarding the suspect network packet to a security virtual appliance running in a second virtual machine executing on the host processor, and
  performing, by the security virtual appliance, a deep packet analysis on the suspect network packet to determine whether the suspect network packet is to be considered harmless,
    when the suspect packet is determined to be harmless, routing the network packet to the originally intended recipient running in the first virtual machine executing on the host processor, and
    when the suspect packet is determined to be non-harmless, dropping the network packet.

8. The method as recited in claim 7, wherein the at least one filter is stored in a protected area of flash memory inaccessible to the host processor, wherein the flash memory is coupled to both the host processor and the second processor.

9. The method as recited in claim 7, wherein the network packet is of suspect status when the network packet breaches a predetermined policy or is deemed to behave in a questionable manner based on rules outlining questionable behavior, wherein the predetermined policy and rules outlining questionable behavior are accessible to the second processor and stored in a protected area of memory on the platform.

10. The method as recited in claim 7, further comprising:
  notifying a user when a packet is received that is determined to be non-harmless.

11. The method as recited in claim 7, wherein routing of a non-harmless network packet is determined by a predetermined policy.

12. The method as recited in claim 7, wherein the determining by the security virtual appliance whether the suspect network packet is to be considered harmless further comprises:
  sending the suspect network packet to a test virtual machine on the platform, wherein the test virtual machine is a third virtual machine executing on the host processor;
  observing, by the security virtual appliance, the result of sending the suspect network packet to the test virtual machine; and
  identifying the suspect network packet as one of harmless or non-harmless based on the results of sending the suspect network packet to the test virtual machine.

13. A non-transitory machine readable storage medium having instructions stored therein for securing network traffic to a host processor on a platform having virtualization technology capability, that when the instructions are executed on the platform cause the platform to:
  (a) receive a network packet by a second processor on the platform, the second processor communicatively coupled to the host processor; and
  (b) apply, by the second processor, at least one filter to first determine whether the network packet is of suspect status, the network packet is determined to be of suspect status when the network packet meets criteria of the at least one filter,
    (i) when the network packet is first determined to be of non-suspect status, route the network packet directly to an originally intended recipient of the network packet via a virtual machine manager (VMM) executing on the host processor, the originally intended recipient of the network packet running in a first virtual machine executing on the host processor, and
    (ii) when the network packet is first determined to be of suspect status:
      indicate, by the second processor, the suspect status of the network packet to a virtual machine manager executing on the host processor,
      forward the suspect network packet to a security virtual appliance running in a second virtual machine executing on the host processor, and
      perform, by the security virtual appliance, a deep packet analysis on the suspect network packet to determine whether the suspect network packet is to be considered harmless,
        when the suspect packet is determined to be harmless, route the network packet to the originally intended recipient running on the first virtual machine executing on the host processor, and
        when the suspect packet is determined to be non-harmless, drop the network packet.

14. The non-transitory machine readable storage medium as recited in claim 13, wherein the at least one filter is stored in a protected area of flash memory inaccessible to the host processor, wherein the flash memory is coupled to both the host processor and the second processor.

15. The non-transitory machine readable storage medium as recited in claim 13, wherein the network packet is of suspect status when the network packet breaches a predetermined policy or is deemed to behave in a questionable manner based on rules outlining questionable behavior, wherein the predetermined policy and rules outlining questionable behavior are accessible to the second processor and stored in a protected area of memory on the platform.

16. The non-transitory machine readable storage medium as recited in claim 13, further comprising instructions that when executed:
  notify a user when a packet is received that is determined to be non-harmless.

17. The non-transitory machine readable storage medium as recited in claim 13, wherein routing of a non-harmless network packet is determined by a predetermined policy.

18. The non-transitory machine readable storage medium as recited in claim 13, wherein the determining by the security virtual appliance whether the suspect network packet is to be considered harmless further comprises instructions that when executed:
  send the suspect network packet to a test virtual machine on the platform, wherein the test virtual machine is a third virtual machine executing on the host processor;
  observe, by the security virtual appliance, the result of sending the suspect network packet to the test virtual machine; and
  identify the suspect network packet as one of harmless or non-harmless based on the results of sending the suspect network packet to the test virtual machine.

* * * * *